(No Model.) 2 Sheets—Sheet 1.
G. WHITNEY.
PHOTOGRAPHIC CAMERA.
No. 471,585. Patented Mar. 29, 1892.
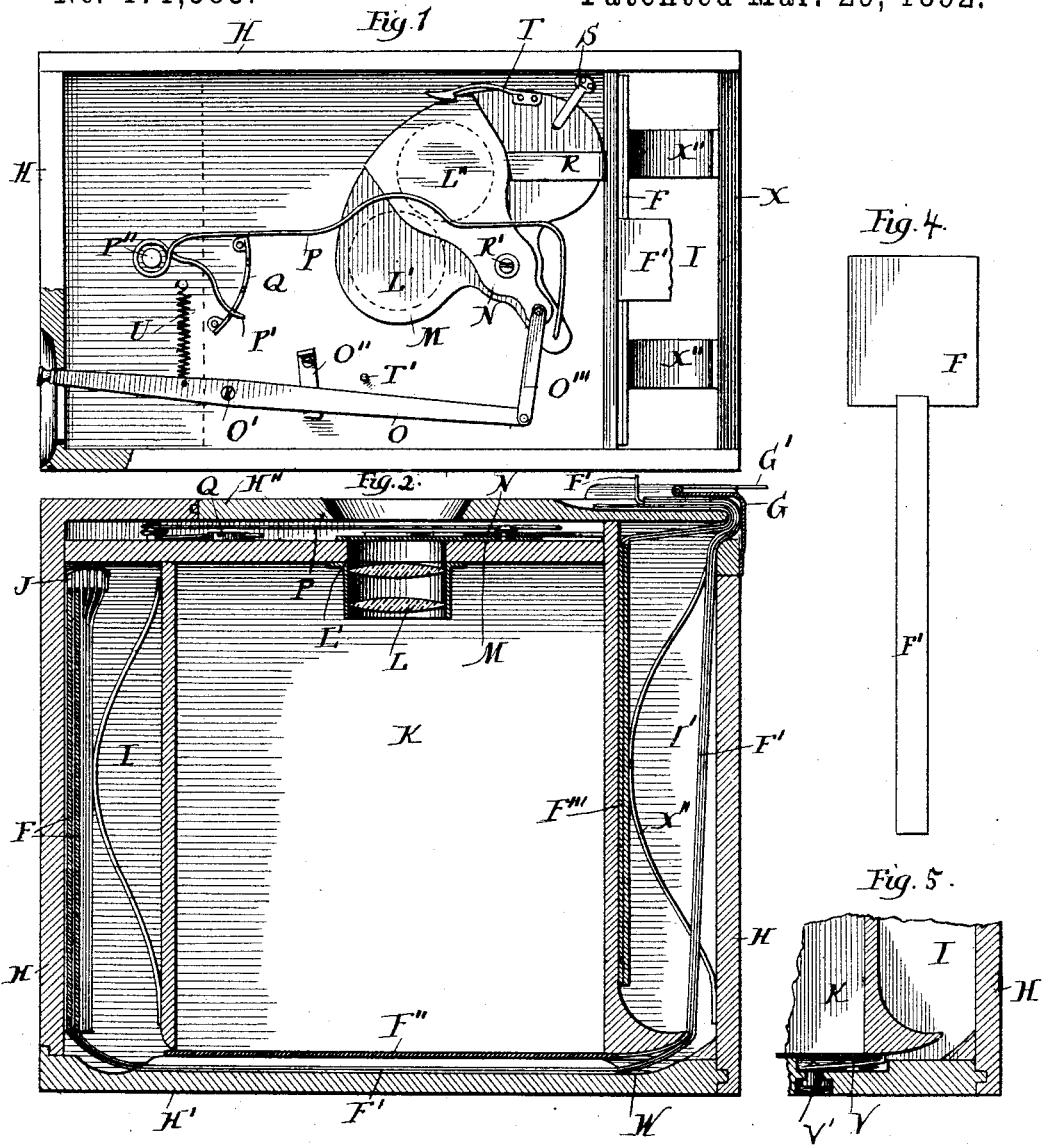
Witnesses:
Fred Gerlach
Lute S. Alter
Inventor:
George Whitney
By G. Whitney Atty.

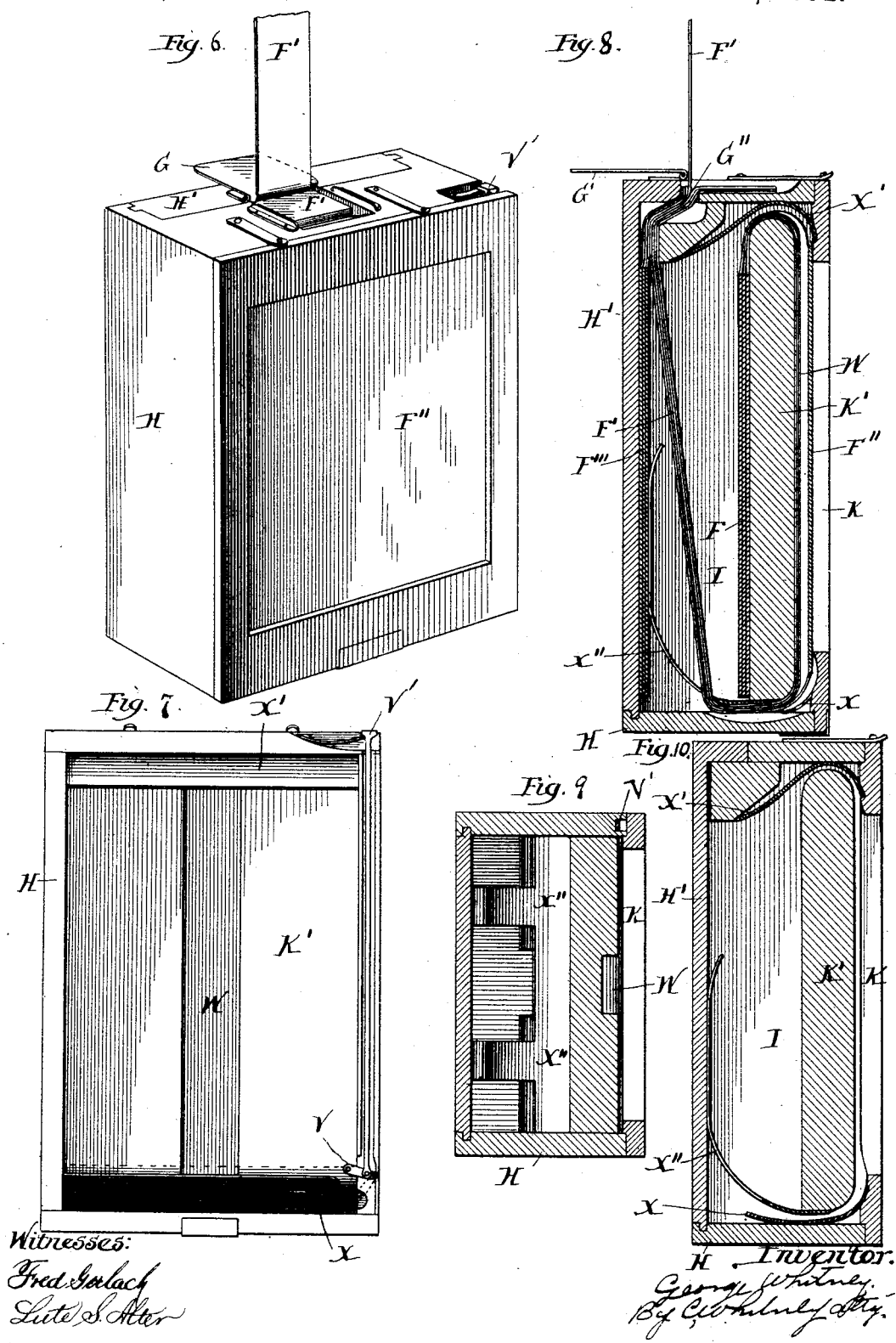

UNITED STATES PATENT OFFICE.

GEORGE WHITNEY, OF WINNETKA, ILLINOIS.

PHOTOGRAPHIC CAMERA.

SPECIFICATION forming part of Letters Patent No. 471,585, dated March 29, 1892.

Application filed December 18, 1890. Serial No. 375,123. (No model.)

*To all whom it may concern:*

Be it known that I, GEORGE WHITNEY, of Winnetka, in the county of Cook and State of Illinois, have invented certain new and useful Improvements in Photographic Cameras and Plate-Holders; and I do hereby declare the following to be a full, clear, and exact description of the same, reference being had to the accompanying drawings, forming a part of this specification, and to the letters of reference marked thereon.

My present invention has for its objects to provide a device for receiving and holding negative plates or films of a size sufficient for a single exposure, whereby said films or plates may be moved one at a time from a chamber in position for being exposed in a camera, and then after exposure transferred to a receiving-chamber, from which they may be removed and developed, as usual; and to this and other ends it consists in certain novelties of construction and combinations of parts, all as will be hereinafter described, and the novel features described and pointed out in the claims at the end of this specification.

In the accompanying drawings, Figure 1 is a front view of a camera, to which one form of my invention is applied, with the cover plate or slide removed; Fig. 2, a sectional view of the same; Fig. 3, a view of a package of film adapted for use in a holder or camera constructed in accordance with my invention; Fig. 4, a view of a single negative plate or film; Fig. 5, a sectional view of a detail; Fig. 6, a perspective view of a holder detached from the camera with a plate in position for exposure; Fig. 7, a front view of the same; Fig. 8, a sectional view of the holder, as shown in Fig. 6; Fig. 9, a longitudinal sectional view of the holder, as shown in Fig. 7, and Fig. 10 a cross-sectional view of an empty holder.

Similar letters of reference refer to similar parts.

In Figs. 1, 2, and 5 I have shown a camera embodying in its construction a plate or film holder made according to my present invention, in which H indicates the casing, provided at the front with a cover-slide H″, and at the rear with a slide or cover H′. Near the front of the casing is a partition or board carrying the lens-tube L′ and lens L, and also the shutter mechanism, and forming an exposing-compartment K. On opposite sides of this compartment are delivery and receiving compartments I I′, in which are placed the plates or film-sheets, each provided with detachable tapes F′, glued or otherwise connected thereto, and forming the means for moving the plates from one compartment to the other.

In Fig. 3 is shown a package of cut film-sheets F, such as may be employed in my present holder, in which the separate plates are placed between the leaves of a book J, composed, preferably, of black or other non-actinic paper. The object attained by the use of this book is to have a thin leaf of paper between each of the negative plates to prevent their adhering to each other, thus preventing one plate from being drawn out when the preceding one is removed. While this package is capable of use in the herein-described holders, the loose p'ates can as well be used, and I have shown it simply for convenience, as it forms the subject-matter of a divisional application filed by me the 18th day of May, 1891, Serial No. 393,148. The back board or slide H′, which in this arrangement constitutes the rear side of the exposure-chamber K, is provided with a central groove W, leading from one chamber I to the other, and assuming the unexposed plates F in the chamber to the left in Fig. 2, the tapes F′ extend from the bottom of said chamber to and along the groove W, up through the other chamber I′, and out through an aperture at the upper end, where they are passed through a light-tight passage formed between a plate G and the slide H″, a pivoted cover-plate G′ affording access to their ends when desired. Located in the chamber I′ to the right are two or more springs X″, serving to hold the exposed plates F‴ against the partition, and between these springs extend the tapes of the unexposed plates. The lower end of the inner side of this partition is extended outward and forms a stop on which the exposed plates are supported, as well as a guide for preventing the entering plates from engaging those already in the chamber.

The operator, when he desires to make an exposure, grasps the tape F′ of the first unexposed plate projecting from under plate G and draws said plate F out of the book J down to the position shown at F″, Fig. 2, in rear of the lens, its motion being stopped here by a small spring-operated catch V, Fig. 5, which engages its end. Then the exposure is made in the usual manner, and then by pressure on a knob V', attached to the catch, said plate is released, and may be again drawn into the storage-chamber I' to the right and the tape torn off at the plate G, the springs X'' serving to hold the exposed plate against the partition out of the way of subsequently entering plates, as shown at F'''.

To insert the plates in this camera it is necessary to remove slides H' H'', and insert the package of unexposed plates in compartment I to the left, either in connection with the book-holder or detached and leading the tapes across the exposing-compartment pass them up through chamber I', and out through the aperture beneath plate G, as in Fig. 2, and then replace the sliding covers. During the exposure the plate is supported by the slide or plate H', the groove W therein serving to accommodate the tapes of the unexposed plates out of contact with it.

A camera or holder of this general description—that is to say, one embodying storage and receiving chambers adapted to contain plates and plates having tapes whereby they are drawn from one chamber to the other—is described in my prior application, Serial No. 366,847, filed October 2, 1890, and I do not, therefore, claim herein these features broadly.

The construction shown in Figs. 5 to 10 embodies a convenient form of magazine-plate or film-holder adapted to be applied to any form of camera, embodying, as it does, the chamber for containing the exposed and unexposed plates or film-sheets back of their support while being exposed. In this construction H represents the main casing, corresponding to the casing of the camera before described, and K the opening at the front where the exposure is made, and which is adapted to be applied to the rear of a camera of the ordinary or any preferred construction. At the rear of the opening K in the casing is a partition or film-support K', having in its front side the groove or depression W for receiving the tapes of the unexposed plates, so that the plate being exposed may lie perfectly flat on said support K'. In this holder both the unexposed and exposed plates are adapted to be contained in the chamber I at the rear of support K', though, if desired, a partition could be placed between them, the unexposed plates resting against the rear of support K', as at F, Fig. 8, with their tapes F' extending over the end thereof through the groove W around the lower end of K', and out through aperture G'', as in Fig. 8. At the ends of support K' are arranged sheet-metal guides X' for the film sheets or plates, and in chamber I are the two springs X'' for holding the exposed plates against the rear of the chamber and preventing contact with the unexposed plates, though permitting the passage of the tapes between them, and as said springs are preferably connected near their lower ends this connecting portion serves as a guard for preventing incoming plates or their tapes from engaging the lower ends of the unexposed plates located against partition K'. Arranged at the end of the opening K is a pivoted stop or catch V for engaging the end of the plate when in position for exposure, being held normally in the path of the latter by a spring operating on the button or rod V', as in Fig. 7. The operation of exposing the plates or film-sheets in this construction is essentially the same as that before described. The operator, opening the door G' and drawing upon the tape F' of the rearmost of the unexposed series, moves said plate around the end of the support K', the plate X' guiding it properly and in front of said support, where it is arrested in proper position for exposure by coming in contact with stop V. After the exposure is made the operator presses button V', removing the stop, as in Fig. 5, and drawing upon the tape moves the plate down and under springs X'', the end of the latter and plate X' guiding it properly and up against the rear of the casing, after which the tape may be torn off. After all the contained plates have been exposed they may be removed and a new package inserted by sliding off the cover H', leaving the chamber I open, as will be understood. It will be noted that by this arrangement of parts not only is the construction simplified, but great economy in space is secured, as the chamber I need only be large enough to contain a single package of film-sheets, they being removed, exposed, and returned beneath the springs X'' by the simple manipulation of the tapes.

In Fig. 1 is illustrated a shutter M, having an exposing aperture L'', pivoted on a stud R', a cover plate or shutter N being also pivoted on said stud, and said two shutters being latched together by a spring-catch T. O indicates a lever pivoted at O' and connected by a link O''' with the cover-shutter N. A spring P is connected at one end to shutter M, coiled around pin P'', and its other end P' is adapted to be connected with a notched segmental plate Q for adjusting the tension. To operate the shutter the outer end of lever O is pressed down, and this brings the shutter-plate down until the aperture L'' has passed the lens-opening L', and the spring-catch T is engaged by trip-pin T', thus disengaging the two plates and permitting the shutter-plate to fly back uncovered through the action of spring P, and when the pressure on the outer end of lever O is released the cover-plate will fly back and engage the catch T, through the action of spring U. R is a time-stop to engage the shutter-plate when its aperture is opposite the lens-opening and is operated by pressure on a button from outside the camera-case. S is a friction-stop for preventing the rebound of the shutter when actuated.

The film-sheets herein described are preferably composed of some light flexible material—such as celluloid—and are cut to approximately the size necessary for a single exposure and termed "plates" simply for convenience of expression, though as far as some of the features of the invention are concerned—for instance, the plate-support with the tape-groove and also the stop for arresting the plate—ordinary glass plates with tapes attached could be used, the containing-compartments therefor being arranged so that no sharp corners would have to be turned in their manipulation.

I claim as my invention—

1. In a holder for plates or film-sheets, the combination, with a casing having compartments for containing unexposed and exposed plates, and also a tape-opening extending from the latter compartment to the exterior, of a support for said plates during exposure, having the tape groove or depression therein, substantially as described.

2. In a holder for plates or film-sheets, the combination, with a casing having compartments for containing unexposed and exposed plates, said casing having also an exposing-aperture and a tape-opening extending to the exterior of the holder, of a stop for engaging and arresting the plate when in front of the exposing-aperture, substantially as described.

3. In a holder for plates or film-sheets having the exposing-aperture, the combination of a plate-support in rear of said aperture, a plate-containing compartment in rear of said plate-support, guides for directing plates moved from in front of the support to the rear of the receiving-compartment, and a tape-opening provided in the holder, extending from said compartment to the exterior of the holder, substantially as described.

4. In a holder for plates or film-sheets having the exposing-aperture, the combination of a plate-support in rear of said aperture having the groove therein, a plate-containing compartment in rear of said plate-support, guides for directing plates moved from the front of said support to the rear of the plate-compartment, and a tape-opening provided in the holder, extending from said compartment to the exterior of the holder, substantially as described.

5. In a holder for plates or film-sheets having the exposing-aperture, the combination of a plate-support in rear of said aperture, a plate-containing compartment in rear of said plate-support, the spring-guides for directing plates moved from the front of the support to the rear of the compartment, and a tape-opening provided in the holder, extending from said compartment to the exterior of the holder, substantially as described.

6. In a holder for plates or film-sheets having the exposing-aperture, the combination of a plate-support in rear of said aperture, a plate-containing compartment in rear of said support, guides for directing plates from the forward part of said compartment to the front of the support, guides for directing the plates to the rear of the compartment, and a tape-opening provided in the holder, extending to the exterior of the holder, substantially as described.

GEORGE WHITNEY.

Witnesses:
A. S. WELLS,
M. E. SHIELDS.